(12) United States Patent
Hoonaard (10) Patent No.: US 8,881,958 B2
(45) Date of Patent: Nov. 11, 2014

(54) FLUID DOSE-MEASURING DEVICE

(75) Inventor: Paul van den Hoonaard, Peachtree City, GA (US)

(73) Assignee: Intelligent Coffee Company, LLC, Scottsdale, AZ (US)

( * ) Notice: Subject to any disclaimer, the term of this patent is extended or adjusted under 35 U.S.C. 154(b) by 184 days.

(21) Appl. No.: 13/501,474

(22) PCT Filed: Dec. 15, 2010

(86) PCT No.: PCT/NL2010/050847
§ 371 (c)(1),
(2), (4) Date: Jun. 28, 2012

(87) PCT Pub. No.: WO2011/074953
PCT Pub. Date: Jun. 23, 2011

(65) Prior Publication Data
US 2012/0261441 A1 Oct. 18, 2012

Related U.S. Application Data (60) Provisional application No. 61/286,973, filed on Dec. 16, 2009.

(51) Int. Cl.
*B67D 3/00* (2006.01)
*B67D 7/74* (2010.01)
*G01F 11/02* (2006.01)

(52) U.S. Cl.
CPC ............ *G01F 11/021* (2013.01); *G01F 11/029* (2013.01)
USPC ...................................... 222/504; 222/129.3

(58) Field of Classification Search
CPC ...... A47J 31/402; A47J 31/46; B05B 7/2481; B67D 3/0041; F16K 27/029; F16K 31/02; F16K 31/06; F16K 31/0675; F16K 31/08; G01F 11/021; G01F 11/029
USPC ..................... 222/129.3, 325, 333, 504, 509; 251/129.15, 129.21
See application file for complete search history.

(56) References Cited

U.S. PATENT DOCUMENTS

| 1,949,661 A | 3/1934 | Schell |
| 2,254,833 A | 9/1941 | Ashkenaz |

(Continued)

FOREIGN PATENT DOCUMENTS

| DE | 2921579 A1 | 12/1980 |
| DE | 19523816 A1 | 1/1997 |

(Continued)

OTHER PUBLICATIONS

Written Opinion, PCT Application No. PCT/US10/60776, pp. 1-6, mailed Feb. 28, 2011.

(Continued)

*Primary Examiner* — Patrick M Buechner
(74) *Attorney, Agent, or Firm* — Volpe and Koenig, P.C.

(57) ABSTRACT

A fluid dose-measuring device adapted to be releasably received in a dispensing apparatus having an electromagnetic coil includes a housing with an outlet passage and a connector part defining an inlet passage, the housing forming an internal chamber which is in fluid communication with the inlet passage and the outlet passage, and the connector part being connectable to a fluid container; a piston moveably arranged in the chamber of the housing for reciprocating motion between a closed position in which a flow from the inlet passage to the outlet passage is prevented and an open position in which a flow from the inlet passage to the outlet passage is allowed, the piston comprising a ferromagnetic actuation part for electromagnetic actuation of the piston by the electromagnetic coil, where the actuation part is arranged in an outer body.

17 Claims, 8 Drawing Sheets

(56) References Cited

U.S. PATENT DOCUMENTS

| | | | |
|---|---|---|---|
| 2,554,570 A | 5/1951 | Harvey | |
| 2,682,984 A | 7/1954 | McLikian | |
| 2,740,553 A | 6/1956 | Maynard | |
| 2,887,255 A | 5/1959 | Bauerlein | |
| 2,979,231 A | 4/1961 | Witherspoon, Jr. | |
| 3,024,718 A | 3/1962 | Morrison | |
| 3,207,079 A | 9/1965 | Sadler | |
| 3,258,166 A | 6/1966 | Kuckens | |
| 3,264,973 A | 8/1966 | Tavera | |
| 3,532,505 A | 10/1970 | Cornelius | |
| 3,634,107 A | 1/1972 | Cornelius | |
| 3,641,918 A | 2/1972 | Schellgell | |
| 3,719,505 A | 3/1973 | Mazza | |
| 3,727,632 A | 4/1973 | Pansini | |
| 3,828,985 A | 8/1974 | Schindler | |
| 4,011,969 A | 3/1977 | Martin | |
| 4,015,755 A | 4/1977 | Lerner | |
| 4,096,893 A | 6/1978 | Economy | |
| 4,164,964 A | 8/1979 | Daniels | |
| 4,334,640 A | 6/1982 | Van Overbruggen | |
| 4,356,937 A | 11/1982 | Simon | |
| 4,393,982 A | 7/1983 | Kuckens | |
| 4,418,848 A | 12/1983 | Lanau | |
| 4,450,987 A | 5/1984 | Boettcher et al. | |
| 4,470,999 A | 9/1984 | Carpiac | |
| 4,471,689 A | 9/1984 | Piana | |
| 4,487,556 A | 12/1984 | Wiernicki | |
| 4,503,507 A | 3/1985 | Arai | |
| 4,515,294 A | 5/1985 | Udall | |
| 4,518,105 A | 5/1985 | Kohl | |
| 4,550,858 A | 11/1985 | Noomen | |
| 4,598,845 A * | 7/1986 | Ozdemir | 222/449 |
| 4,624,395 A | 11/1986 | Baron | |
| 4,660,742 A | 4/1987 | Ozdemir | |
| 4,708,266 A | 11/1987 | Rudick | |
| 4,722,372 A | 2/1988 | Langille | |
| 4,775,301 A * | 10/1988 | Cartwright et al. | 417/417 |
| 4,791,859 A | 12/1988 | King | |
| 4,808,346 A | 2/1989 | Strenger | |
| 4,901,886 A | 2/1990 | Kirschner | |
| 4,901,890 A | 2/1990 | Mivelaz | |
| 4,903,586 A | 2/1990 | King | |
| 4,921,131 A | 5/1990 | Binderbauer | |
| 4,986,448 A * | 1/1991 | Takahashi et al. | 222/129.1 |
| 5,025,714 A | 6/1991 | Brewer | |
| 5,111,740 A | 5/1992 | Klein | |
| 5,114,047 A | 5/1992 | Quadros | |
| 5,154,319 A | 10/1992 | Plester | |
| 5,188,019 A | 2/1993 | Vahabpour | |
| 5,190,652 A | 3/1993 | Van Thoor | |
| 5,193,593 A * | 3/1993 | Denis et al. | 141/10 |
| 5,197,865 A | 3/1993 | Sevrain | |
| 5,269,443 A | 12/1993 | Lancaster | |
| 5,275,309 A | 1/1994 | Quadros | |
| 5,295,611 A | 3/1994 | Simard | |
| 5,312,017 A | 5/1994 | Romanyszyn, Jr. | |
| 5,332,123 A | 7/1994 | Deininger | |
| 5,353,963 A | 10/1994 | Heinz | |
| 5,615,801 A | 4/1997 | Wittig | |
| 5,656,316 A | 8/1997 | Lavanchy | |
| 5,662,461 A | 9/1997 | Ono | |
| 5,740,719 A | 4/1998 | Triola | |
| 5,836,482 A | 11/1998 | Ophardt | |
| 5,842,603 A | 12/1998 | Cloud | |
| 5,895,672 A | 4/1999 | Cooper | |
| 5,909,846 A | 6/1999 | Sasaki | |
| 5,918,768 A | 7/1999 | Ford | |
| 5,975,357 A | 11/1999 | Topar | |
| 5,992,685 A | 11/1999 | Credle, Jr. | |
| 6,073,539 A | 6/2000 | Triola | |
| 6,126,045 A * | 10/2000 | Last | 222/501 |
| 6,161,722 A | 12/2000 | Niknezhad | |
| 6,173,117 B1 | 1/2001 | Clubb | |
| 6,209,751 B1 | 4/2001 | Pribonic | |
| 6,257,445 B1 | 7/2001 | Means | |
| 6,343,724 B1 | 2/2002 | Ophardt | |
| 6,394,312 B1 | 5/2002 | Endou | |
| 6,564,968 B1 | 5/2003 | Spilotro | |
| 6,568,565 B1 | 5/2003 | Chadwell | |
| 6,589,577 B2 | 7/2003 | Bucuzzo | |
| 6,607,762 B2 | 8/2003 | Beaulieu | |
| 6,644,173 B2 | 11/2003 | Beaulieu | |
| 6,651,849 B2 | 11/2003 | Romanyszyn, Jr. | |
| 6,662,976 B2 | 12/2003 | Jensen | |
| 6,676,908 B2 | 1/2004 | Robinson, Sr. | |
| 6,698,333 B2 | 3/2004 | Whitney | |
| 6,722,527 B1 | 4/2004 | Krauss | |
| 6,740,345 B2 | 5/2004 | Cai | |
| 6,808,731 B1 | 10/2004 | Connor | |
| 6,810,931 B2 | 11/2004 | Graffin | |
| 6,886,556 B2 | 5/2005 | Fuchs | |
| 6,974,052 B1 | 12/2005 | D Hond | |
| 6,990,391 B1 | 1/2006 | Cohlmia | |
| 7,048,149 B1 | 5/2006 | Lassota | |
| 7,077,339 B2 | 7/2006 | Leach | |
| 7,104,184 B2 | 9/2006 | Biderman | |
| 7,182,280 B2 | 2/2007 | Ye | |
| 7,578,419 B2 | 8/2009 | Greenwald | |
| 7,594,525 B2 * | 9/2009 | Girard et al. | 141/362 |
| 7,896,202 B2 | 3/2011 | Greenwald | |
| 8,091,735 B2 * | 1/2012 | Girard et al. | 222/54 |
| 8,196,781 B2 * | 6/2012 | Greenwald et al. | 222/207 |
| 8,210,396 B2 * | 7/2012 | Girard et al. | 222/129.1 |
| 2002/0148356 A1 | 10/2002 | Beaulieu | |
| 2003/0145736 A1 | 8/2003 | Green | |
| 2004/0074921 A1 | 4/2004 | Lips | |
| 2004/0084475 A1 | 5/2004 | Nelson | |
| 2004/0226962 A1 | 11/2004 | Mazursky | |
| 2006/0144244 A1 * | 7/2006 | Girard et al. | 99/295 |
| 2006/0283889 A1 | 12/2006 | Hellenberg | |
| 2008/0029541 A1 | 2/2008 | Hunter | |
| 2008/0173705 A1 | 7/2008 | Greenwald | |
| 2009/0057341 A1 * | 3/2009 | Girard et al. | 222/129.1 |
| 2009/0149988 A1 | 6/2009 | Wood, Jr. | |
| 2012/0305605 A1 * | 12/2012 | Vassaux et al. | 222/325 |
| 2013/0277587 A1 * | 10/2013 | Zieger et al. | 251/129.15 |

FOREIGN PATENT DOCUMENTS

| | | |
|---|---|---|
| EP | 0067466 A2 | 12/1982 |
| FR | 2813861 A1 | 3/2002 |
| JP | 3129494 A2 | 6/1991 |
| JP | 6211299 A2 | 8/1994 |
| NL | 1003894 C1 | 3/1998 |
| WO | 8901751 A1 | 3/1989 |
| WO | 9118826 A2 | 12/1991 |
| WO | 99/05446 A1 | 2/1999 |
| WO | 9937577 A3 | 7/1999 |
| WO | 0079224 A1 | 12/2000 |
| WO | 0149154 A1 | 7/2001 |
| WO | 02081354 A1 | 10/2002 |
| WO | 2004104527 A1 | 12/2004 |
| WO | 2005070816 A1 | 8/2005 |
| WO | 2005071267 A1 | 8/2005 |
| WO | 2005079361 A2 | 9/2005 |

OTHER PUBLICATIONS

Written Opinion, PCT Application No. PCT/NL2010/050847, pp. 1-8, mailed Jun. 19, 2012.

* cited by examiner

FLUID DOSE-MEASURING DEVICE

CROSS-REFERENCE TO RELATED APPLICATIONS

This application is the National Stage of International Application No. PCT/NL2010/050847, filed Dec. 15, 2010, which claims the benefit of U.S. Provisional Application No. 61/286,973, filed Dec. 16, 2009, the contents of which is incorporated by reference herein.

FIELD OF THE INVENTION

The invention relates to a fluid dose-measuring device adapted to be releasably received in a dispensing apparatus having an electromagnetic coil. The device comprises a housing with an outlet passage and a connector part defining an inlet passage, wherein said housing forms an internal chamber which is in fluid communication with the inlet passage and the outlet passage. Inside the chamber, a piston is moveably arranged for reciprocating motion. The inlet is connectable to a fluid container.

BACKGROUND OF THE INVENTION

Such a device is known for instance from U.S. Pat. No. 3,258,166. This document discloses a device comprising a housing with an outlet defining a valve seat, an electromagnetic actuator for discharging metered quantities of liquid from a container, and including a piston which is in sealing engagement with the valve seat when the coil of the electromagnetic device is deenergized, but rises above the valve seat to permit the escape of liquid when the coil is energized. The escape of liquid may be caused by gravity or pressure inside the container. Especially for relatively high viscosity liquids, the liquid may also be forced through the outlet by oscillation of the piston.

The device can function as a valve when the piston due to its reciprocating movement merely opens or closes a fluid path from inlet passage to outlet passage, so that the amount of escaped fluid is, amongst others, determined by the time the fluid path is open. Fluid is then forced out of the container by gravity and/or pressure inside the container and the piston is only reciprocated for opening and closing. This type of dose-measuring device is typically used for low-viscosity fluids.

The device can function as a pump when the piston displaces fluid through the outlet passage using the reciprocating motion. The device, and in particular the piston, may then be provided with valves, in particular non-return valves, such as for instance disclosed in U.S. Pat. No. 4,487,556. Each time, the piston reciprocates, an amount of fluid is dispensed through the outlet. The flow rate is determined amongst others by the stroke of the piston and the frequency of reciprocations. This type of dose-measuring device is typically used for high-viscosity fluids, but can also be used for low-viscosity fluids. As the flow rate is determined by the stroke and frequency of reciprocations of the piston, the amount of dispensed fluid is fairly predictable. This makes this type therefore more suitable for accurate dose-measuring than a device which functions as a valve.

A combination as described in U.S. Pat. No. 3,258,166, in which the device primarily functions as a valve, but oscillation of the piston aids in forcing the fluid through the outlet passage, is also possible.

The piston is actuated by an electromagnetic field interacting with ferromagnetic material in the piston. As is known in the art, an electromagnetic field can be produced in many ways. However, the electromagnetic field is preferably produced with a coil, e.g. solenoid coil or also referred to as electromagnetic coil, as this allows easy control of the electromagnetic field. By appropriately energizing the coil, the piston will move in one direction. The piston may move back to the original position to form a single reciprocation by deenergizing the coil in combination with gravity, pressure inside the container, or a spring force applied by a spring element, or may return to its original position by appropriately energizing the coil again.

As the ferromagnetic material has to interact with an electromagnetic field, the housing is permeable to the electromagnetic field, i.e. permeable to a magnetic flux.

An application of the fluid dose-measuring devices can be found in beverage dispensers using liquid beverage concentrate which is mixed with water, e.g. hot or cold water. The concentrate is then dispensed from a container by a dose-measuring device. Another application can be found in pharmaceutical devices in which for instance two substances have to be mixed, or a single substance has to be delivered to a patient in a specific dose over time.

As known in the art, the dose-measuring device may be permanently integrated with a container which after being emptied is thrown away with preferably minimal influence on the environment. An advantage of combining the container and a dose-measuring device in a disposable unit is that it simplifies the use for an operator or user when installing or removing the container with dose-measuring device as the connection between the container and device is already made and does not have to be removed after usage. The fluid dose-measuring device is therefore also preferably disposable or recyclable. In that case, the solenoid coil is preferably not part of the dose-measuring device, but part of a dispensing apparatus which receives the dose-measuring device with container.

Especially when the dose-measuring device is used for fluids in the food or pharmaceutical industry, the piston may have to meet certain requirements. First, the piston must comprise ferromagnetic material to allow electromagnetic actuation of the piston. Second, the piston is preferably inert to the fluids used, i.e. reactions between piston and fluid must be kept to a minimum or be absent, to prevent contamination of the fluids and damage to the piston, because ferromagnetic materials have very limited corrosion resistance. Third, the piston is preferably fabricated such that it is able to smoothly reciprocate inside the housing, which is advantageous from efficiency and wear point of view.

Current dose-measuring devices try to meet all of these requirements by machining a single piece of ferromagnetic material, e.g. iron, and cover the piston with an protective coating of a material impermeable and inert to the fluid, e.g. electroless nickel coating. To meet the third requirement, the machining and coating is carried out using strict specifications and tolerances. However, as a result, the fabrication process of the piston is complex and time-consuming and provides limited design freedom of the piston itself.

SUMMARY OF THE INVENTION

It is an object of the invention to provide an improved dose-measuring device, preferably which is more economical to manufacture, and more preferably, which has an increased design freedom.

In a first aspect of the invention, this object is achieved by providing a fluid dose-measuring device adapted to be releasably received in a dispensing apparatus having an electromagnetic coil, comprising:

- a housing with an outlet passage and a connector part defining an inlet passage, said housing forming an internal chamber which is in fluid communication with the inlet passage and the outlet passage, and said connector part being connectable to a fluid container;
- a piston moveably arranged in the chamber of the housing for reciprocating motion between a closed position in which a flow from the inlet passage to the outlet passage is prevented and an open position in which a flow from the inlet passage to the outlet passage is allowed, said piston comprising a ferromagnetic actuation part for electromagnetic actuation of the piston by the electromagnetic coil, wherein the actuation part is arranged in an outer body.

An advantage is that the abovementioned first requirement of the ferromagnetic material is dealt with by the actuation part, and the second and third requirement may be dealt with by the separately manufactured outer body. As a result, more materials are suitable for the outer body, so that a suitable material with a simple manufacturing process can be chosen. Further, the actuation part can be made simpler as there is no need for a protective coating on the surface of the ferromagnetic actuation part. As a consequence, the overall manufacturing of the device is more economical.

Another advantage may be that the outer body is able to protect the ferromagnetic material in a more efficient way. Protective coatings applied to the ferromagnetic actuation part of the piston not always result in an efficient protection as the coating processes could leave some small areas uncovered, which may result in undesired contact between ferromagnetic material and the fluid to be dispensed. Applying a protective coating is therefore from a yield point of view not very attractive.

A further advantage may be that the design freedom of the piston has increased with respect to material choice and associated fabrication possibilities, thereby also allowing a more complex design at relatively low cost. Further, the actuation part can be made in a universal design, and the differences in design of the piston can be formed in the outer body, so that the actuation part is the same for every device type and thus the actuation behaviour is similar, thereby allowing a uniform actuation scheme.

In an embodiment, fluid is able to pass through the piston via at least one internal passage, and at least part of sidewalls of the piston are in full, possibly sealing, engagement with a sidewall, i.e. peripheral wall, of the housing. In a minimum requirement the outer body only needs to be provided at areas where there may be contact between the actuation part and the fluid inside the chamber, so possibly not between the actuation part and the sidewall of the housing or not entirely. The body may comprise a seal between the piston and the sidewall of the housing to prevent fluid from entering a space between the actuation part and the sidewall of the housing.

In a preferred embodiment, the actuation part is encapsulated by the outer body. An advantage over a partially covered actuation part, is that it simplifies the design and fabrication as no seals are required and thus also the tolerances may be less tight. Also the chance of leakages due to wear and damages are smaller.

The outer body is preferably made of a non-metallic material, more preferably made of a plastic. This allows the body to be injection-moulded and also ensures that the body is compatible with a wide variety of fluids, especially fluids used in the food and pharmaceutical industry. It also allows a magnetic field to penetrate the outer body to interact with the ferromagnetic material of the actuation part.

In an embodiment, the piston in the closed position sealingly engages with the outlet passage, preferably from the chamber side of the outlet passage, i.e. the piston does not protrude through the outlet passage and therefore does not engage with the outlet passage from the outside of the housing. This has the advantage that pressure inside the container, e.g. due to squeezing the container, will firmly keep the piston in the closed position, so that the chance of leaking of the device during handling is minimized.

The housing preferably comprises a peripheral wall, a bottom wall, and a top wall. The peripheral wall being located between the bottom wall and the top wall. The connector part is attached to the top wall, so that the inlet passage extends from the top wall to a free end of the connector. The outlet passage is situated in the bottom wall. Preferably, the housing only allows the escape and entering of fluid via the inlet passage and the outlet passage, i.e. no other passages or openings are provided in the housing. Further, the walls of the housing and the connector part are preferably rigid.

The peripheral wall preferably forms a tubular housing closed at its end by the bottom wall and top wall. One of the inlet or outlet passage, but preferably both passages are aligned with a longitudinal axis of the tubular housing. This will ensure a more symmetric flow pattern through the chamber.

In an embodiment, the outer body comprises at least one internal passage to allow a fluid flow from the inlet side of the piston to the outlet side of the piston. Preferably, the outer body has one or more valves, preferably non-return valves, preferably integrated in the internal passage allowing fluid to flow only from the inlet side of the piston to the outlet side of the piston. The device is then able to function as a pump with the advantage that the dispensed flow rate is now dependent on the frequency of reciprocations and the stroke of the piston inside the housing. As a result, the dispensed amount is much more predictable with respect to dispensed amounts being dependent on gravity and/or pressure inside the container. The dispensed amount per cycle, i.e. per a single reciprocation, thus depends on the stroke of the piston which can be set by appropriately energizing the electromagnetic coil and the design of the housing. By changing the design of the housing, for instance by providing a longer chamber inside the housing, the maximum stroke of the piston can be changed. Alternatively, the stroke can be adjusted by appropriately energizing the electromagnetic coil, with the maximum stroke as an upper limit.

It is noted that the ability to integrate the non-return valves in the outer body is at least partially a result of the increased design freedom of the piston obtained by a device according to the invention over prior art devices.

In case the body is made of plastic, the one or more non-return valves can be injection-moulded integrally with the outer body at the same time in a simple manner.

In an embodiment, the outer body is composed of two parts which in assembled state confine, i.e. retain, preferably encapsulate the actuation part. The two parts may therefore define a cavity in which the actuation part is placed, i.e. received. By dividing the outer body in two parts, the actuation part may be fairly easy introduced into the cavity, after which the cavity is closed off to prevent fluid from entering the cavity. Preferably, one of the outer body parts has a cup shape to form the cavity, and the other outer body part closes off the cavity, e.g. in the form of a plug introduced into the cavity. The two parts may be made of different materials, e.g.

different plastics, for instance, one part may be made of TPE, i.e. thermoplastic elastomer, and the other part may be made of acetal, i.e. polyoxymethylene plastic, also known as polyacetal or polyformaldehyde.

In an embodiment, the one or more non-return valves are integrated in one of the two parts of the outer body and the other part comprises associated valve seats for the one or more non-return valves. However, an embodiment wherein one of the two parts comprises the valves and associated valve seats is also possible. It is envisaged that only one part has an internal passage. In that case, fluid flows through one part and passes the other part on the outside of said part. Also an embodiment in which each part has an internal passage is possible. From a manufacturing point of view it may be advantageous to design only one part with an internal passage as this makes it easier to manufacture the integrated non-return valves. Manufacturing integrated non-return valves inside a passage is more difficult than manufacturing them at the end of an internal passage.

In an embodiment, the piston is moveable in a direction from the inlet passage to the outlet passage and vice versa, so that the piston is able to alternatingly move from and towards the outlet passage and force the fluid through the outlet passage when moving towards the outlet passage. Alternatively, the piston can move perpendicular to the direction from the inlet passage to the outlet passage and vice versa, which is an embodiment that is particularly suitable for a device that functions as a valve.

In an embodiment, the housing is composed of two parts. Each part preferably including one of the inlet and outlet passage. The part comprising the outlet passage is preferably formed by the peripheral wall and the bottom wall, and the part comprising the inlet passage is preferably formed by the top wall and the connector part. The part comprising the outlet passage then also has a cup shape with a cavity in which the piston can be placed.

In an embodiment, the piston is spring loaded by a spring element, e.g. a coil spring and/or compression spring, tending to move the piston towards the closed position. This ensures that after deenergizing of an electromagnetic coil, the piston is automatically moved back to its closed position. Moving back to its closed position may also be done with the aid of pressure inside the container, gravity, or by energizing the coil in an appropriate manner. Preferably, the spring element keeps the piston in the closed position when the coil is deenergized, so that the closed position is not or less dependent of gravity. This has the advantage that the device with fluid container can be held upside down without the risk of leakage of the device, assuming that the spring is able to counteract gravitational forces on the piston.

The spring element preferably extends from the piston into the inlet passage, i.e. into the connector part. Preferably, the spring element extends over more than half the length of the connector part.

An advantage is that the spring element can now be designed much longer than in case it is provided between the piston and the inlet passage as is common in the prior art. A longer design has the advantage that the fabrication tolerances are less critical, and the spring element is easier to handle during assembly. Further, the total length of the device may not be affected by the longer spring element.

To further increase the length of the spring element, the spring element may also extend into the piston. The piston may therefore be provided with a cavity or recess in which the spring element can be received.

In an embodiment, the piston comprises a stem that may extend into the connector part, and the spring element is provided around the stem. When the stem has a sufficient length it prevents the spring element from buckling. At least the stem is able to hold one end of the spring element. The spring element is preferably a coil spring, so that the stem can be received inside the windings of the coil spring. The length of the spring element is larger than the length of the stem to allow the piston to reciprocate inside the chamber without the stem damaging and/or touching the interior of the connector part, i.e. the inlet passage.

In an embodiment, the outer body comprises a protrusion that sealingly engages with the outlet passage in the closed position to prevent fluid from flowing through the outlet passage. The protrusion therefore preferably extends into the outlet passage in the closed position.

In a preferred embodiment, the protrusion and the outlet passage have respective sealing surfaces engaging with one another in the closed position, wherein the sealing surface of the outlet passage extends substantially to the exterior surface of the housing, e.g. the bottom surface of the housing when the outlet passage is situated in the bottom wall. In this manner, in the closed position, no or minimal fluid is trapped in the housing between the piston and the outlet passage which is in contact with air outside the chamber. Therefore, drying of the fluid in the closed position which may result in a clogged device is minimized or prevented at all. And even when the device gets clogged and/or the piston gets stuck in the closed position, a user or machine is able to free the outlet passage and/or release the piston via the outlet passage as the protrusion extends into the outlet passage in the closed position and is therefore reachable.

In an embodiment, the connector part is preferably a male part to be connected to a female part of a fluid container. The female part has a body containing an axial bore which extends from an insert opening for the male part through the body, and a seat extending around the bore for a plug which serves to close off the bore. The bore of the female part forms a shoulder between the insert opening and the seat, said shoulder facing towards the insert opening. The plug is provided with at least one elastic hooking part with corresponding hooking surface, wherein the hooking part rests in a first position with its hooking surface against the shoulder, and wherein the male part has a head and a recess located behind the head for receiving the hooking part of the plug when the male part is inserted into the bore, so that the plug connects with the male part, i.e. corresponding to a first connection position. When the male part is pushed further, i.e. to a second connection position, the plug disengages from the seat allowing fluid communication. Subsequently pulling the male part back to the first connection position will result in closing of the bore by the plug again. For instance, a connector assembly according to WO 99/05446 is used. An advantage is that connecting and disconnecting the male part, i.e. the device, automatically opens and closes the fluid container without the risk of leakage. Disconnecting the dose-measuring device may be advantageous when the fluid container is used again and needs to be refilled. It is noted here that depending on the design of the device, a refill may also be done via the dose-measuring device, so that disconnecting the dose-measuring device is not essential.

Connecting the dose-measuring device to a filled fluid container may expose the content of the fluid container to air already present in the dose-measuring device. It may therefore be desired that the dose-measuring device is pre-assembled to the fluid container, but fluid communication between fluid container and dose-measuring device is blocked until the fluid container is used, i.e. will be emptied. The connection between dose-measuring device and fluid container may therefore at first be such that fluid communication is prevented, e.g. corresponding to a first position as described above, but when the fluid container including dose-measuring device is placed in a dispenser the blockage is removed automatically by an actuator, e.g. in the form of a leverage pushing the device further into the container, or by a coupling action of an operator, such as a twist or push action of the dose-measuring device relative to the fluid container, e.g. corresponding to a second position as described above. This may be combined with a tamper-evident device, showing that the content of the fluid container has not been exposed to air, not even the small amount of air that may be present in the dose-measuring device.

A tamper-evident device may also be provided at the outlet passage. A foil can cover the outlet passage from the outside so that it is visible that the device never has been used before. When installing the device in a dispensing apparatus, the tamper-evident device, i.e. the foil needs to be removed prior to installing, or the foil is penetrated in the dispensing apparatus when first placed or actuated.

The invention also relates to a method for manufacturing a dose-measuring device, preferably a device according to the first aspect of the invention, adapted to be releasably received in a dispensing apparatus having an electromagnetic coil, comprising the following steps:
  manufacturing a housing with an inlet passage and a connector part defining an inlet passage, said housing forming an internal chamber which is in fluid communication with the inlet passage and the outlet passage, and said connector part being connectable to a fluid container;
  manufacturing a ferromagnetic actuation part;
  manufacturing an outer body;
  assembling the actuation part and the outer body to form a piston, such that the actuation part is arranged in the outer body;
  assembling the piston and the housing, such that the piston is moveably arranged in the chamber for reciprocating motion.

In an embodiment, the housing is composed of two parts, each part comprising one of the inlet and outlet passage. The part comprising the outlet passage preferably comprises a peripheral wall and bottom wall of the housing, and the part comprising the inlet passage preferably comprises a top wall of the housing and the connector part. In that case, assembling the piston and the housing comprises the steps:
  positioning the piston in the part comprising the outlet passage; and
  assembling the part with the outlet passage and the part with the inlet passage to form the housing with the piston inside.

In an embodiment, the outer body of the piston is composed of two parts, one part having a cup shape with a cavity to receive the actuation part and the other part being configured to close of the cavity, wherein the step of assembling the actuation part and the outer body of the piston comprises the steps:
  positioning the actuation part in the cavity; and
  closing the cavity by assembling the two parts of the outer body.

In an embodiment, the device comprises a spring element, so that the method for fabricating the device comprises the step of introducing the spring element in the connector part of the housing before assembling the piston and the housing.

Alternatively, the piston may comprise a stem which is received in the connector part of the housing, and the spring element is put over the stem before assembling the piston and the housing.

The method may further comprise the step of providing a layer of material over the outlet passage as a tamper-evident foil.

In a second aspect of the invention, a fluid dose-measuring device is provided which is adapted to be releasably received in a dispensing apparatus having an electromagnetic coil, said device comprising:
  a housing with an outlet passage and a connector part defining an inlet passage, said housing forming an internal chamber which is in fluid communication with the inlet passage and the outlet passage, and said connector part being connectable to a fluid container;
  a piston moveably arranged in the chamber of the housing for reciprocating motion between a closed position in which a flow from the inlet passage to the outlet passage is prevented and an open position in which a flow from the inlet passage to the outlet passage is allowed, said piston comprising a ferromagnetic actuation part for electromagnetic actuation of the piston by the electromagnetic coil,
  a spring element tending to move the piston towards the closed position,
wherein the spring element extends from the piston into the inlet passage, i.e. into the connector part. Preferably, the spring element is a compression spring and/or a coil spring.

An advantage of the second aspect of the invention is that the spring element can be designed much longer than in the prior art. A longer design has the advantage that the fabrication tolerances are less critical, and the spring element is easier to handle during assembly. Further, the total length of the device may not be affected by the longer spring element.

Another advantage of the second aspect of the invention may be that the spring biases the piston towards the closed position, so that the piston is more reliably held in the closed position than by gravity and/or pressure inside the fluid container. Gravity has the disadvantage that it only works in one direction independent of the orientation of the device, so that when the device including fluid container is held upside down, the piston may move to the open position due to gravity and the device starts to leak and/or air will enter the fluid container. Pressure has the disadvantage that it may not be a constant parameter, especially not when the fluid container is emptied, so that especially when the fluid container is almost empty, the pressure is not able to keep the piston reliably in its closed position, in particular not when the device is held upside down. A suitable spring element keeps the piston in its closed position independent of the orientation of the device.

Yet another advantage of the second aspect may be that the overall length of the dose-measuring device with respect to prior art designs does not have to be changed due to the use of the connector part which is generally present to connect the device to a fluid container.

In an embodiment, at least half of the spring element is received in the connector part in the closed position of the piston. Preferably at least 70% of the spring element is received in the connector part.

In an embodiment, at least half of the length of the connector part receives the spring element.

The internal cross sectional area of the connector part is preferably smaller than the external cross sectional area of the piston or the internal cross sectional area of the chamber.

In an embodiment, the piston may have a stem at the inlet side of the piston which may extend into the connector part. In that case, the spring element is preferably provided around the stem. Due to the presence of the stem, the spring element may be prevented from buckling and is forced into a predetermined shape or orientation, so that its behaviour is predictable. The predictable behaviour is advantageous when the spring element is used to push the piston towards the closed position when the coil is deenergized. Pushing the piston back has to be done in a certain time frame otherwise there is a risk that the coil is energized again before the piston reaches the closed position and less fluid is ejected than expected.

The spring element may also extend into the piston to further increase the length of the spring element. The piston may therefore comprise a recess or cavity to receive the spring element.

It is noted here that a skilled person will understand that the force applied by the spring element on the piston can be overcome by the electromagnetic actuation of the piston using a coil to ensure proper functioning.

It is further noted that the features described in relation with the first or second aspect of the invention can readily be combined in any way suitable.

The invention further relates to in combination a dose-measuring device according to the first and/or second aspect of the invention and a fluid container connectable to the connector part of the device.

Preferably, the connector part is a male connector part and the fluid container comprises a female connector part, wherein the dose-measuring device is connected to the fluid container by introduction of the male connector part into the female connector part.

In an embodiment, the connector part has a first and second connection position relative to the fluid container, wherein in the first connection position the connector part is pre-assembled to the fluid container and fluid communication between fluid container and device is blocked, and wherein in the second connection position the connector part is connected to the fluid container and the fluid container is in fluid communication with the device, e.g. the chamber of the device.

The connector part may be configured to move between the first and second connection position by a relative translation with respect to the fluid container in longitudinal direction of the connector part.

Alternatively or additionally, the connector part may be configured to move between the first and second connection position by a relative rotation with respect to the fluid container about an axis parallel to a longitudinal direction of the connector part.

The invention also relates to a method for manufacturing a dose-measuring device, preferably a device according to the second aspect of the invention, adapted to be releasably received in a dispensing apparatus having an electromagnetic coil, comprising the following steps:
- manufacturing a housing with an inlet passage and a connector part defining an inlet passage, said housing forming an internal chamber which is in fluid communication with the inlet passage and the outlet passage, and said connector part being connectable to a fluid container;
- manufacturing a piston;
- positioning a spring element into the inlet passage, i.e. the connector part;
- assembling the piston and the housing such that the piston is moveably arranged in the chamber for reciprocating motion and is spring loaded by the spring element.

Further, the invention relates to a dispensing system comprising:
- an electromagnetic coil;
- a controller to drive the coil;
- a dose-measuring device according to the first and/or second aspect of the invention, said device being receivable by the solenoid coil; and
- a fluid container connected to the dose-measuring device.

The invention also relates to a method to place a combination of a fluid dose-measuring device, preferably a device according to the first and/or second aspect of the invention, and a fluid container into a dispensing apparatus, said method comprising the following steps:
- providing the combination of the fluid dose-measuring device and the fluid container, wherein the fluid dose-measuring device is connected to the fluid container such that the device is in a first connection position relative to the fluid container, and wherein in the first connection position fluid communication between fluid container and device is blocked, i.e. prevented;
- putting the device in a second connection position relative to the fluid container, wherein in the second connection position the device is connected to the fluid container and the device is in fluid communication with the fluid container; and
- introducing the combination of the device and the fluid container into the dispensing apparatus.

In an embodiment, the step of putting the device in a second connection position relative to the fluid container is automatically performed by the dispensing apparatus while introducing the combination of device and fluid container into the dispensing apparatus. This step is then not performed by the user or operator.

It is to be noted that the first and second connection position may be similar to the respective first and second connection position described in respect of the combination mentioned earlier.

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION OF THE INVENTION

Figure 1:
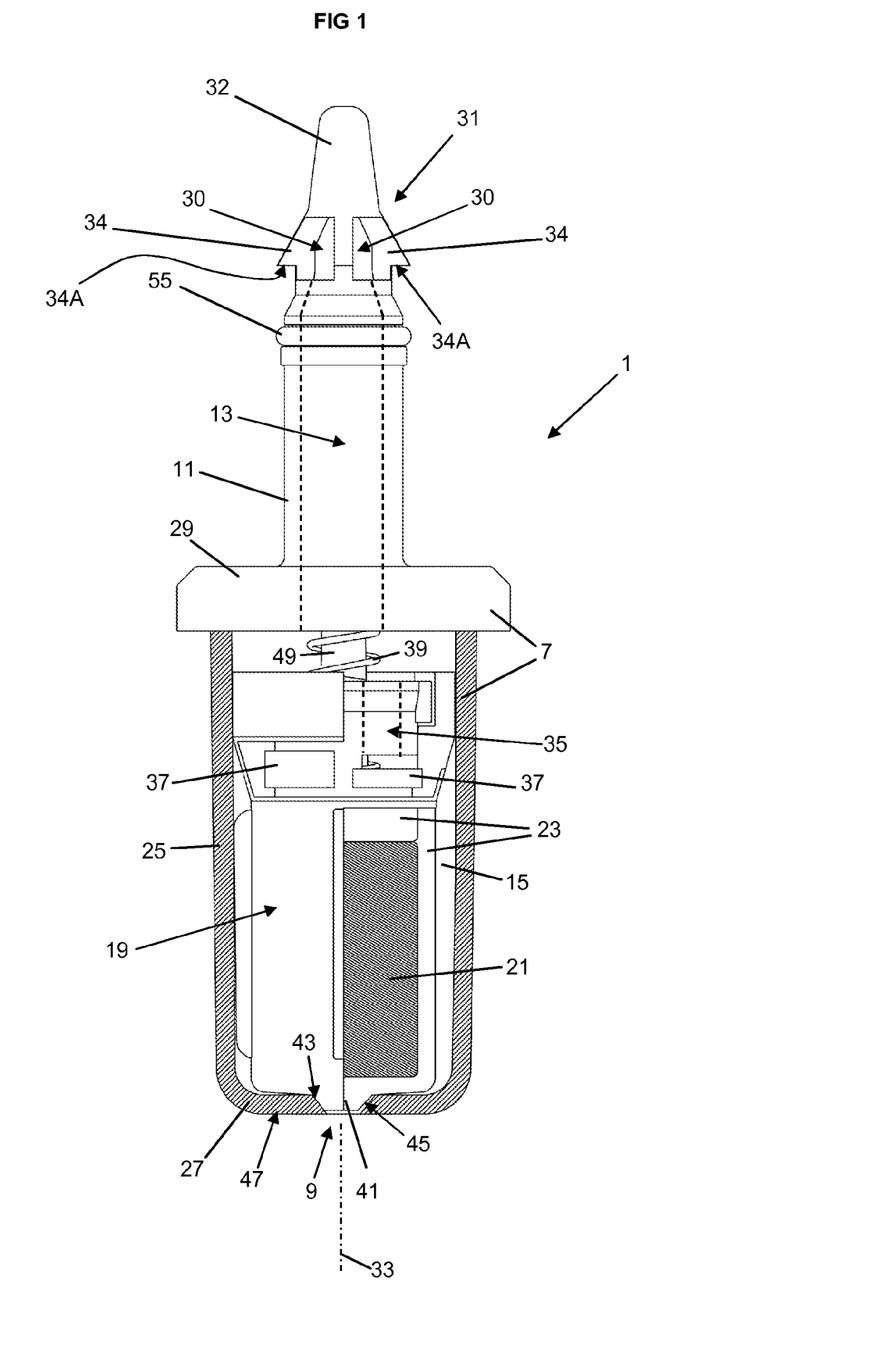
FIG. 1 shows a fluid dose-measuring device according to the first and second aspect of the invention in a partial cut-away view.

FIG. 1 shows a fluid dose-measuring device 1 according to an embodiment of the invention in partial cut-away view. The device 1 is adapted to be releasably received in a dispensing apparatus 3 (see FIG. 2) having an electromagnetic coil 5.

The device 1 comprises a housing 7 (see FIG. 1) with an outlet passage 9 and a connector part 11 defining an inlet passage 13 which is depicted with dashed lines. The housing 7 forms an internal chamber 15 which is in fluid communication with the inlet passage 13 and the outlet passage 9. The connector part 11 is connectable to a fluid container 17 (see FIG. 2). The fluid container 17 can be a pouch or a bag.

Figure 4A:
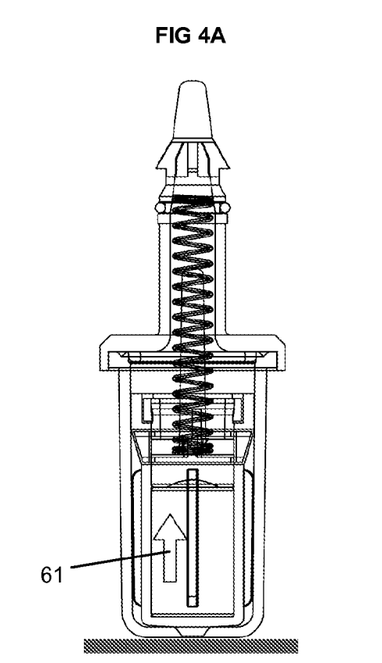
FIG. 4A-4D show schematically in transparent view the working principle of the device of FIG. 1.
Figure 4B:
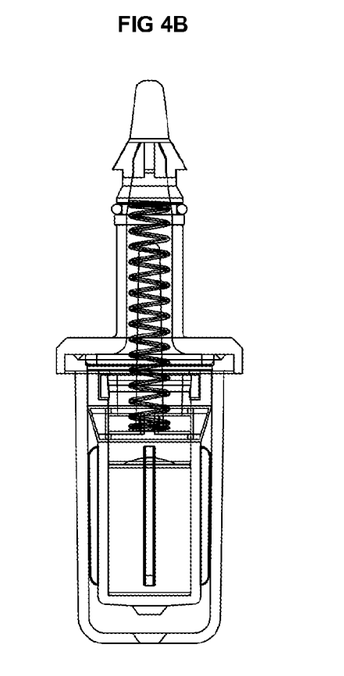
Figure 4C:
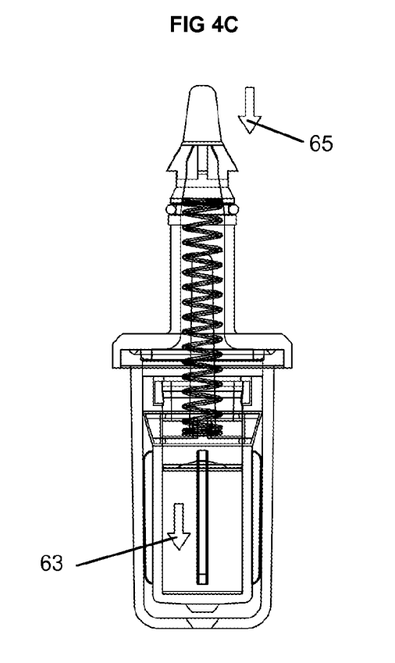

The device 1 further comprises a piston 19 (see FIG. 1) moveably arranged in the chamber 15 of the housing 7 for reciprocating motion between a closed position (as shown in FIG. 1) in which a flow from the inlet passage 13 to the outlet passage 9 is prevented and an open position (as shown in FIGS. 4B and 4C) in which a flow from the inlet passage to the outlet passage is allowed. The piston 19 comprises a ferromagnetic actuation part 21 for electromagnetic actuation of the piston 19 by the electromagnetic coil 5.

The actuation part 21 is arranged in a separate outer body 23 (see FIG. 1), thereby depicting the first aspect of the invention. The device also depicts the second aspect of the invention, as the device also comprises a spring element 39 tending to move the piston 19 towards the closed position. The spring element 39 extends from the piston into the inlet passage, i.e. into the connector part, as can be more clearly seen in FIGS. 2 and 4A-4D.

In this embodiment, the actuation part 21 is encapsulated by the outer body 23, thereby ensuring minimal contact between the fluid in the chamber 15 and the actuation part 21.

In FIG. 1 the piston is shown in the closed position, wherein the piston sealingly engages with the outlet passage 9. This sealing engagement is provided by a protrusion 41 having a sealing surface 43, wherein the protrusion 41 in the closed position extends into the outlet passage 9. The sealing surface 43 is in that case in engagement with a sealing surface 45 of the outlet passage 9. The respective sealing surfaces 43, 45 are defined by the surface areas that contact each other in the closed position. As can be seen in FIG. 1, sealing surface 45 substantially extends to the outer surface 47 of the housing, thereby minimizing the available space for fluid to remain in the outlet passage, resulting in less fluid being in contact with outside air and thus less chance of drying and clogging of the outlet passage.

The housing 7 comprises a peripheral wall 25, a bottom wall 27, and a top wall 29, wherein the outlet passage 9 is situated in the bottom wall 27, and wherein the connector part 11 is attached to the top wall 29 so that the inlet passage 13 extends from the top wall to a free end 31 of the connector part.

The peripheral wall 25 forms a tubular housing, wherein the inlet passage and the outlet passage are aligned with a longitudinal axis 33 of the tubular housing.

The outer body 23 has an internal passage 35 depicted in dashed lines to allow fluid to flow from the inlet side of the piston to the outlet side of the piston. Integrated into the internal passage 35 are non-return valves 37, here in the form of flapper valves, but any kind of non-return valve may advantageously be employed. The non-return valves 37 only allow fluid to flow from the inlet side of the piston to the outlet side of the piston. It is noted that in FIG. 1 the right valve 37 is only partially shown due to the partial cut-away view. The left valve 37 is shown entirely.

The flapper valves 37 are moveable about a pivot axis (not shown) which may extend parallel to longitudinal axis 33 or may extend in tangential direction of the piston. In case the pivot axis extends in tangential direction, the pivot axis is preferably provided at the inlet side of the flapper valve to allow a smooth flow profile with respect to a pivot axis at the outlet side of the flapper valve.

At the free end 31 of the connector part 11, the device comprises inlet ports 30 through which fluid can enter the inlet passage 13. The device further comprises a head 32 which connects with a plug 52 of a female connector part 51 of the container 17 (see FIG. 2). The plug 52 is attached to the female connector part via flexible arms 54. The device also comprises hooks 34 which may be elastic and comprise a hooking surface 34A which engages with a shoulder of a bore in the female connector part. The hooks may provide a permanent connection between connector part 11 and female connector part 51 after insertion of the connector part into the female connector part. By moving the device 1 further into the female connector, the head 32 of the device is able to lift the plug 52 of its seat to allow fluid communication between the container and the device.

Figure 3:
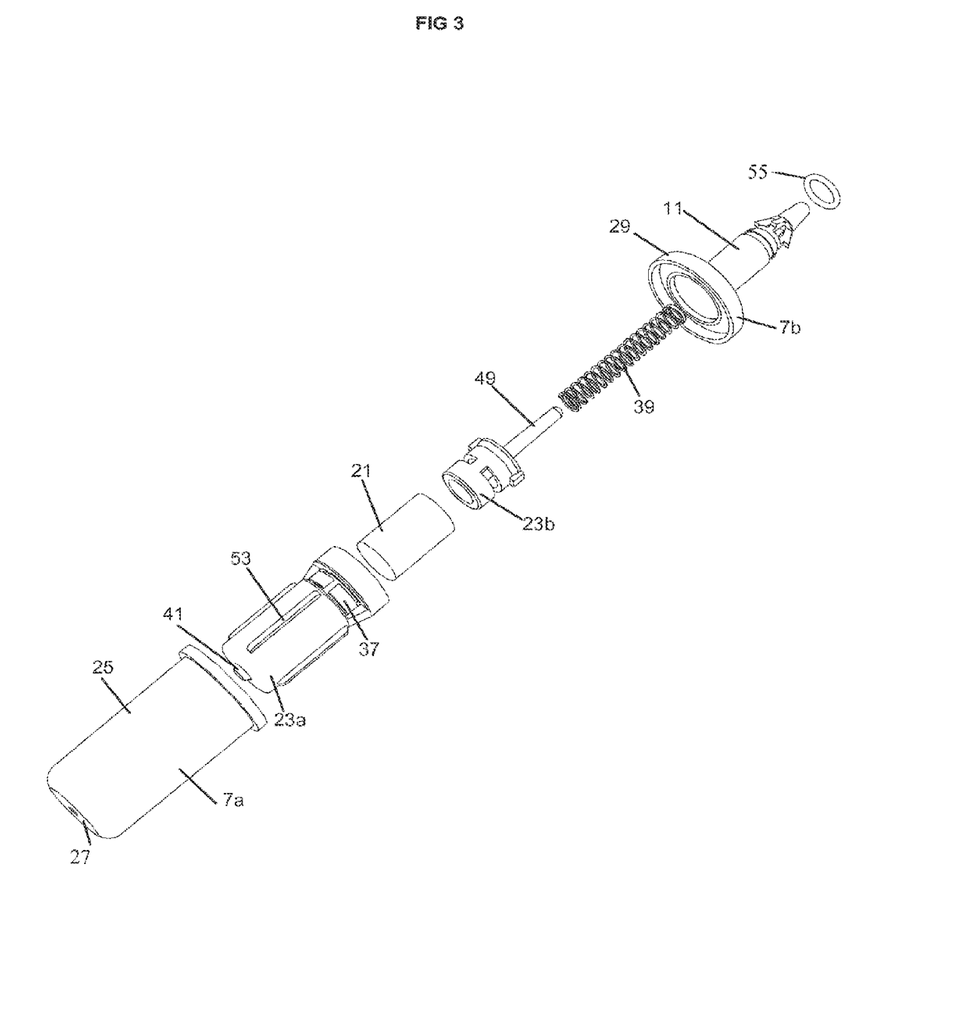
FIG. 3 shows the device of FIG. 1 in exploded view.

In FIG. 3 the device of FIG. 1 is shown in exploded view. From this FIG. 3 it can be clearly seen that the outer body 23 is composed of two parts 23a, 23b, which in assembled state confine the actuation part 21. The part 23a has a cup shape with a cavity to receive the actuation part. On the outside of the part 23a, ribs 53 are provided. The ribs 53 will make contact with the peripheral wall 25 of the housing to guide the piston during reciprocating motion in the chamber. The non-return valves 37 are integrally fabricated with the part 23a.

The part 23b comprises the internal passage 35 and the seats for the non-return valves 37 of the part 23a. Fluid will therefore flow through the internal passage, pass the non-return valves and continue between the ribs 53 on the outside of the part 23a. When assembling the piston, the actuation part 21 is positioned in the cavity of the part 23a, after which the part 23b closes the cavity like a plug.

The part 23b further comprises a stem 49 to be received in the inlet passage 13. The spring element 39 is placed over the stem 49 so that the chance of buckling of the spring element is minimal.

At the free end 31 of the connector part 11, an O-ring 55 is provided as a seal between the connector part 11 and a female connector 51 (see FIG. 2) in which the connector part 11 is received.

From FIG. 3 it also follows that the housing 7 is composed of two parts 7a, 7b. Part 7a has a cup shape and comprises the peripheral wall 25 and bottom wall 27. Part 7b comprises the top wall 29 and extending from the top wall the connector part 11. Part 7a forms a cavity that is closed by part 7b to form the internal chamber.

Figure 2:
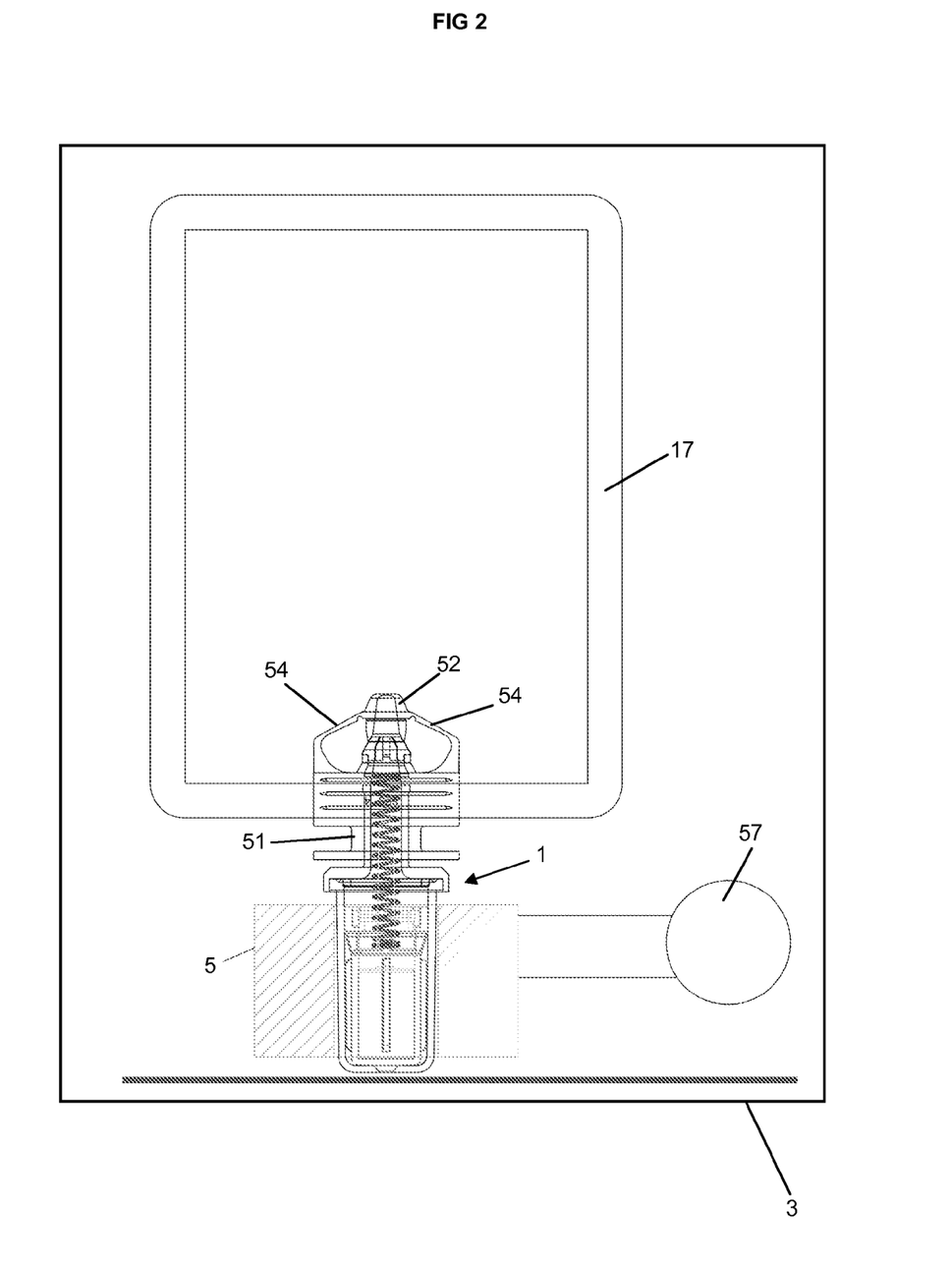
FIG. 2 shows a dispensing system according to another embodiment of the invention.

FIG. 2 shows a dispensing apparatus 3 according to the invention, wherein a dose-measuring device 1 according to the invention is received in the electromagnetic coil 5. The dose-measuring device is connected to the container 17 by a female connector 51 which receives the connector part 11 of the device 1. The connector part 11 is thus a male connector part. The apparatus 3 further comprises a controller 57 to drive the electromagnetic coil 5.

An example of driving the electromagnetic coil will be explained with reference to FIGS. 4A-4D. In FIG. 4A, the coil is deenergized and the piston is in the closed position. The coil is subsequently energized in an appropriate manner such that due to interaction between the generated electromagnetic field and the ferromagnetic material of the piston, the piston will move to an open position as indicated by arrow 61 in FIG. 4A. Due to pressure of fluid in the container the non-return valves will open, i.e. in this case pivot about their respective pivot axes, to allow the piston to move through the fluid column in the chamber to the open position as indicated by FIG. 4B.

Figure 4D:
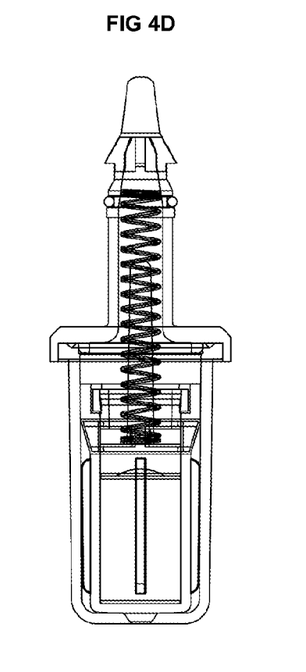

The electromagnetic coil is subsequently deenergized so that the piston is moved back to the closed position by the spring element 39, indicated by arrow 63 in FIG. 4C. Due to the fluid inside the chamber and associated pressure, the non-return valves will close, and while travelling to the closed position, the piston forces fluid out of the chamber through the outlet passage. At the same time, fluid is drawn out of the container into the chamber as indicated by arrow 65 in FIG. 4C. A full reciprocating motion is reached once the piston is back in the closed position, as indicated in FIG. 4D. And a new cycle beginning at FIG. 4A can commence.

It is noted here that when multiple reciprocating motions are performed after each other, the piston does not necessarily has to reach the closed position in between two reciprocating motions. The reciprocating motions may also be performed between two open positions. The last reciprocating motion will however preferably end in the closed position to prevent leakage.

Figure 5A:
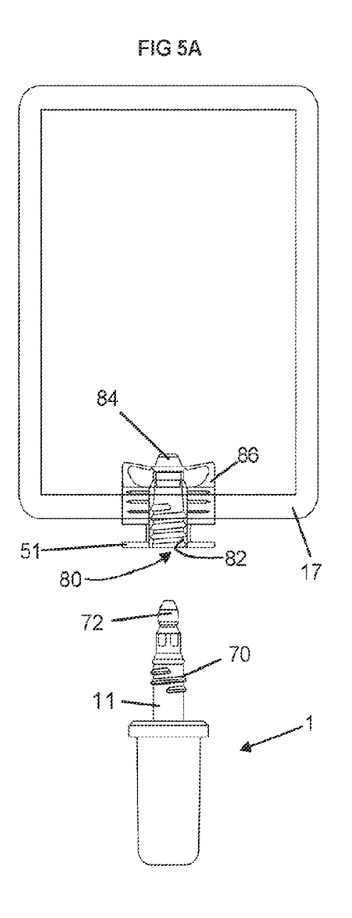
FIG. 5A-5C show schematically in combination a dose-measuring device according to the invention and a fluid container.

FIG. 5A shows schematically in combination a dose-measuring device 1 according to an embodiment of the invention and a fluid container 17. The device 1 and fluid container are shown in disassembled state in FIG. 5A.

The device 1 is similar to the dose-measuring device of FIG. 1 and comprises a connector part 11. The connector part 11 is a male connector part and has a external thread 70 arranged at an outer surface of the connector part 11.

The fluid container 17 comprises a female connector part 51 for receiving the connector part 11. The female connector part 51 has a body 86 containing an axial bore which extends from an insert opening 80 for the male connector part 11 through the body, and a seat extending around the bore for a plug 84 which serves to close off the bore. In FIG. 5A, the plug is shown in its seat. The bore has an internal thread 82 which is configured to cooperate with the external thread of the device when the male connector part is inserted into the bore.

Figure 5B:
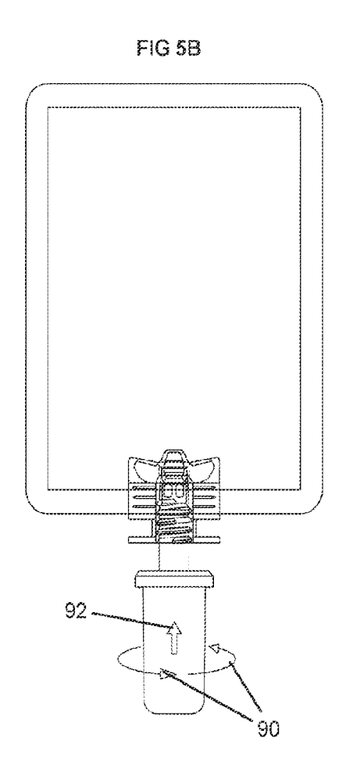

The plug 84 is configured to connect with a head 72 of the male connector part when the male connector part is inserted into the bore. The position in which the male connector part is connected to the plug of the female connector part, but the plug is in its seat and thus closes off the bore is referred to as the first connection position of the device 1 relative to fluid container 17. This situation is shown in FIG. 5B. When the device is in the first connection position, the device is not in fluid communication with the fluid container, and thus contact between the content of the fluid container and air outside the fluid container, even the small amount of air present in the device is prevented.

Figure 5C:
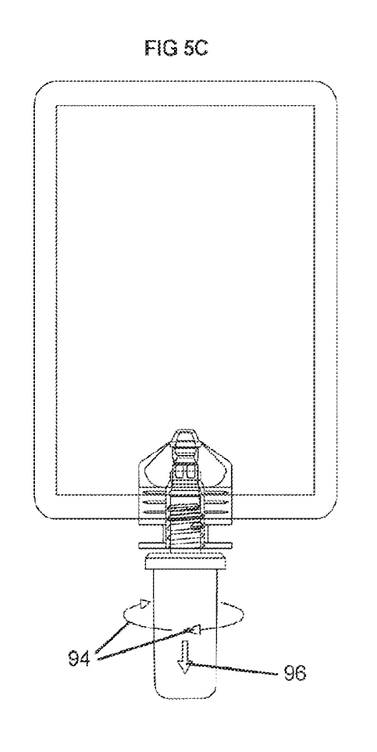

When the combination of device and container is to be used in a dispensing apparatus, fluid communication between device and fluid container is obtained by a rotation of the device with respect to the fluid container, such that the cooperation between the internal thread and the external thread causes the device to be inserted more into the female connector part, so that the plug 84 is disengaged from its seat and no longer closes off the bore. This position of the device relative to the fluid container is referred to as the second connection position (see FIG. 5C). The rotation of the device is shown in FIG. 5B by arrow 90 and the subsequent translation of the device is shown by arrow 92. To go back from the second connection position in FIG. 5C to the first connection position in FIG. 5B, the device has to be rotated in an opposite direction. This opposite rotation is shown by arrow 94 in FIG. 5C and the subsequent translation is shown by arrow 96 in FIG. 5C.

The rotation of the device with respect to the fluid container can be carried out by a person placing the combination in a dispensing apparatus, preferably prior to placing the combination in the dispensing apparatus. However, the dispensing apparatus may alternatively or additionally be provided with actuators to rotate the device with respect to the fluid container after placing the combination in the dispensing apparatus.

Figure 6A:
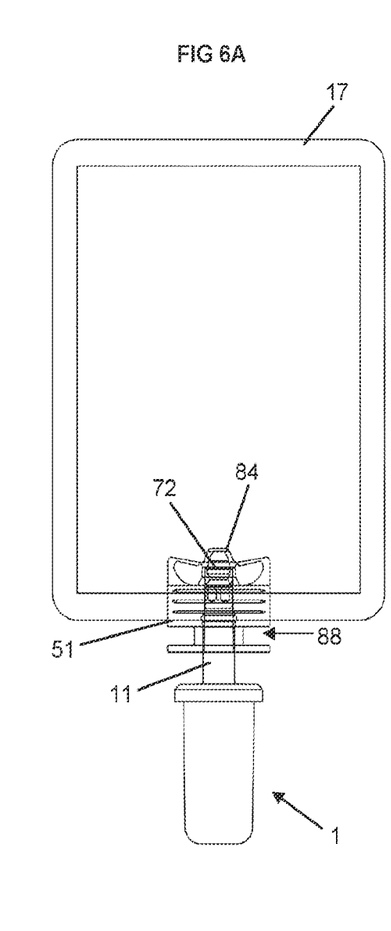
FIG. 6A-6C show schematically in combination a dose-measuring device according to another embodiment of the invention and a fluid container.

FIG. 6A shows schematically a dose-measuring device 1 according to another embodiment of the invention and a fluid container 17. The dose-measuring device 1 is similar to the devices shown in FIG. 1 and FIG. 5A-5C, but has no external thread arranged at the outer surface of male connector part 11.

The fluid container 17 comprises a female connector part 51 for receiving the male connector part of the device. The fluid container 17 is similar to the fluid containers shown in FIG. 5A-5C, but has no internal thread in the bore of the female connector part.

The male connector part 11 in FIG. 6A is inserted into the bore of the female connector part and a head 72 of the male connector part connects with the plug 84 of the female connector part. The plug 84 in the position shown in FIG. 6A closes of the bore and thus prevents fluid communication between the fluid container and the device. This position is referred to as the first connection position.

Figure 6B:
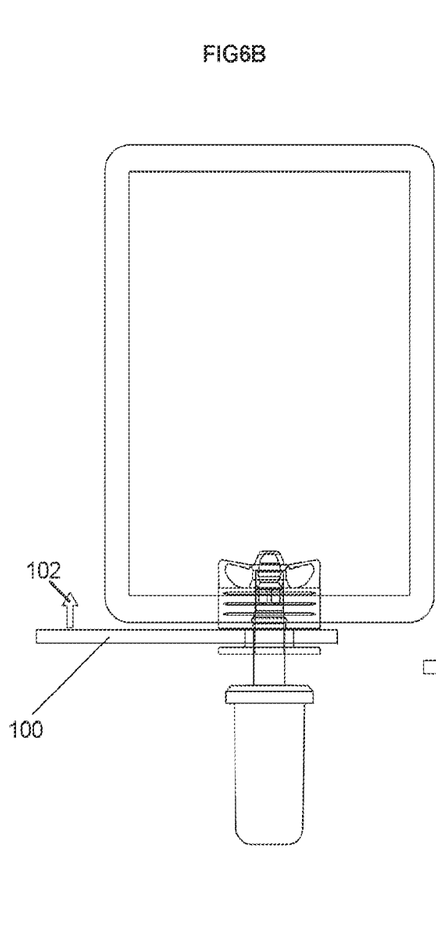

The female connector part 51 has a recess 88 for receiving a lever arm 100 of a dispensing apparatus (see FIG. 6B). When the device is in the first connection position, the content of the fluid container can not contact air outside the fluid container, not even the small amount of air in the device. In this situation, the combination will be transported to a dispensing apparatus. After placement, the lever arm 100 will be received in the recess 88 of the female connector part.

Figure 6C:
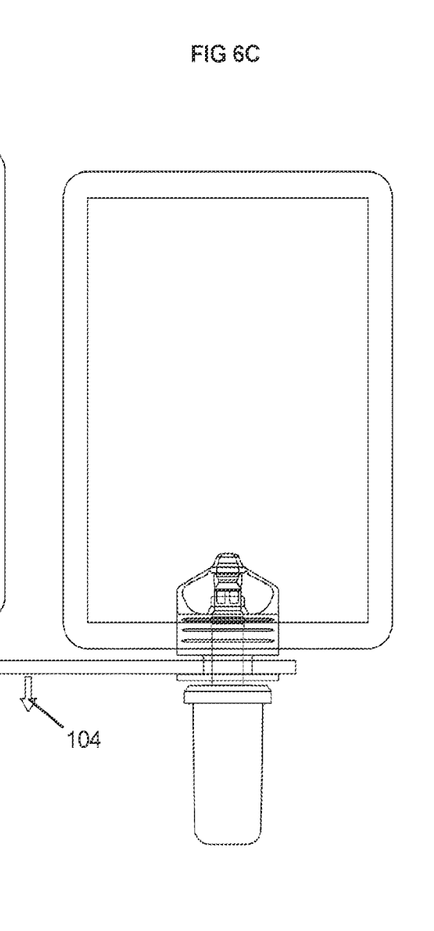

By pushing the lever arm 100 downwards as indicated by the arrow 104 in FIG. 6C, the device can be brought into a second connection position in which the plug is disconnected from its seat and fluid communication between the device and fluid container is allowed. Bringing the device back to its first connection position as shown in FIG. 6B can be done by pushing the lever arm 100 upwards as indicated by arrow 102. During the relative motion between the device and the fluid container as indicated by arrows 102, 104, the device has to be retained in its position. This can for instance be done by an electromagnetic coil in which the lower part of the device 1, i.e. the part with the piston and actuation part, will be placed in. See for example FIG. 2.

Figure 7A:
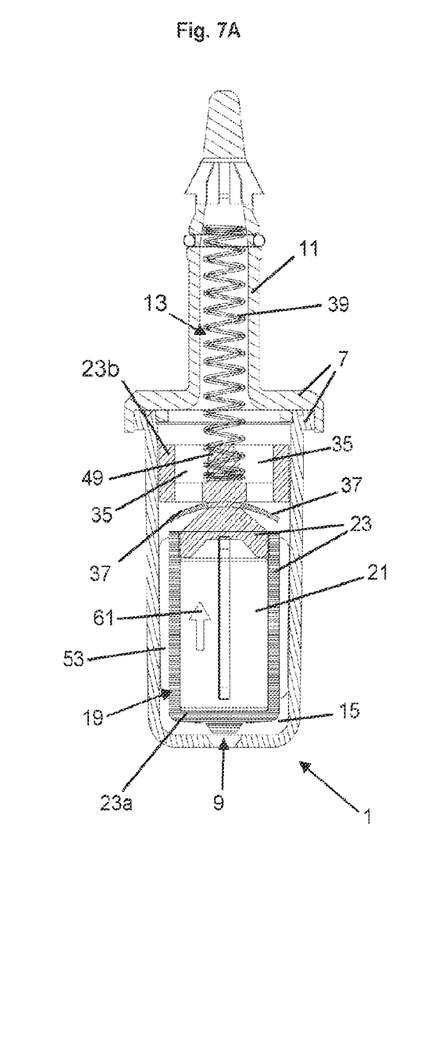
FIG. 7A-7B show in cross sectional view a dose-measuring device according to yet another embodiment of the invention.

FIG. 7A shows a cross sectional view of a dose-measuring device 1 according to yet another embodiment of the invention. The device 1 is adapted to be releasably received in a dispensing apparatus, for instance the dispensing apparatus according to FIG. 2.

The device 1 comprises a housing 7 with an outlet passage 9 and a connector part 11 defining an inlet passage 13. The housing 7 forms an internal chamber 15 which is in fluid communication with the inlet passage 13 and the outlet passage 9. The connector part 11 is connectable to a fluid container, for instance the fluid container of FIG. 3, 5 or 6.

Figure 7B:
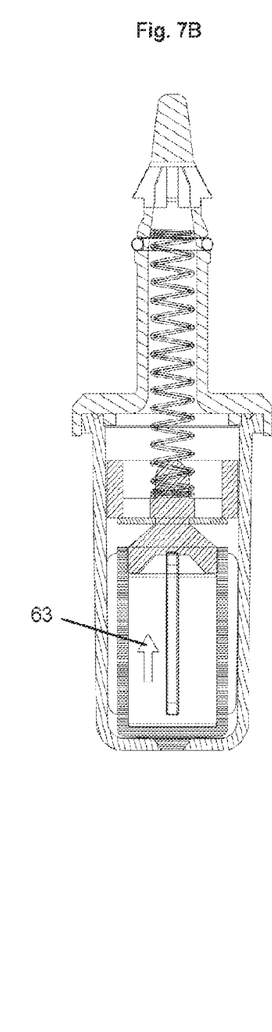

The device 1 further comprises a piston 19 moveably arranged in the chamber 15 of the housing 7 for reciprocating motion between a closed position (similar to the position of the device 1 in FIG. 1) in which a flow from the inlet passage 13 to the outlet passage 9 is prevented and an open position (as shown in FIGS. 7A and 7B) in which a flow from the inlet passage to the outlet passage is allowed. The piston 19 comprises a ferromagnetic actuation part 21 for electromagnetic actuation of the piston 19 by an electromagnetic coil.

The actuation part 21 is arranged in a separate outer body 23, thereby depicting the first aspect of the invention. The device also depicts the second aspect of the invention as the device also comprises a spring element 39 tending to move the piston 19 towards the closed position. The spring element 39 extends from the piston into the inlet passage, i.e. into the connector part.

In this embodiment, the actuation part is encapsulated by the outer body 23, thereby ensuring minimal contact between the fluid in the chamber 15 and the actuation part 21.

The outer body 23 has an internal passage 35 to allow fluid to flow from the inlet side of the piston to the outlet side of the piston. Integrated into the internal passage are non-return valves 37. In FIG. 7A, the valves 37 are shown in an open position in which fluid flows from the inlet side of the piston to the outlet side of the piston. This is caused by the upward movement of the piston, i.e. in the direction of the inlet passage, indicated by the arrow 61. In FIG. 7B, the valves 37 are shown in a closed position so that fluid below the valves 37, i.e. on the outlet side of the vales 37, can be forced out of the device through the outlet passage by movement of the piston towards the closed position, as indicated by arrow 63.

The working principle of the device 1 is similar to the working principle of the device according to FIGS. 1 and 4A-4D. FIG. 7A thus corresponds to FIG. 4B and FIG. 7B corresponds to FIG. 4C.

The outer body 23 is composed of two parts 23a, 23b, which in assembled state confine the actuation part 21. The part 23a has a cup shape with a cavity to receive the actuation part. On the outside of the part 23a, ribs 53 are provided to guide the piston during reciprocal motion.

The part 23b comprises the internal passage 35 and the non-return valves 37. The part 23b also acts as a plug to close of the cavity in part 23a.

The part 23b has a protrusion 49 around which the spring element is provided. It is noted here that this protrusion is not extending into the connector part, but functions to hold one end of the spring element. The advantage of the protrusion not extending into the connector part is that the inlet passage is not restricted by the protrusion and thus, fluid is able to flow smoothly through the inlet passage.

The invention claimed is:

1. A fluid dose-measuring device adapted to be releasably received in a dispensing apparatus having an electromagnetic coil, the device comprising:
a housing with an outlet passage and a connector part defining an inlet passage, said housing forming an internal chamber that is in fluid communication with the inlet passage and the outlet passage, and said connector part being connectable to a fluid container;
a piston moveably arranged in the internal chamber of the housing for reciprocating motion between a closed position in which a fluid flow from the inlet passage to the outlet passage is prevented and an open position in which a fluid flow from the inlet passage to the outlet passage is allowed, said piston comprising a ferromagnetic actuation part for electromagnetic actuation of the piston by the electromagnetic coil,
the piston further comprises an outer body made of plastic, the outer body comprising a protrusion to sealingly engage with the outlet passage in the closed position, and said ferromagnetic actuation part is arranged in the outer body such that the outer body encapsulates said ferromagnetic actuation part and prevents contact between said ferromagnetic actuation part and said fluid flow through the internal chamber of the housing, wherein the outer body and the outlet passage have respective sealing surfaces engaging with each other in the closed position, and the sealing surface of the outlet passage extends to an exterior surface of the housing.

2. The device according to claim 1, wherein the housing comprises a peripheral wall, a bottom wall, and a top wall, said outlet passage being situated in the bottom wall, and said connector part being attached to the top wall, wherein the inlet passage extends from the top wall to a free end of the connector part.

3. The device according to claim 2, wherein the peripheral wall forms a tubular housing, and wherein the inlet passage and outlet passage are aligned with a longitudinal axis of the tubular housing.

4. The device according to claim 1, wherein the plastic outer body has an internal passage to allow fluid to flow from an inlet side of the piston proximal to the inlet passage to an outlet side of the piston proximal to the outlet passage.

5. The device according to claim 4, wherein the outer body has one or more non-return valves in the internal passage that only allow fluid flow only from the inlet side of the piston to the outlet side of the piston.

6. The device according to claim 1, wherein the outer body of the piston is composed of two plastic outer body parts that in an assembled state encapsulate the actuation part.

7. The device according to claim 6, wherein one plastic outer body part of the two plastic outer body parts has a cup shape with a cavity to receive the ferromagnetic actuation part, and the other plastic outer body part is configured to close off the cavity.

8. The device according to claim 1, wherein the housing is composed of two housing parts, one housing part comprising the outlet passage and the other housing part comprising the inlet passage.

9. The device according to claim 1, wherein the piston is spring loaded by a spring element urging the piston towards the closed position.

10. The device according to claim 9, wherein the spring element is a compression spring.

11. The device according to claim 9, wherein the spring element is a coil spring.

12. The device according to claim 9, wherein the plastic outer body of the piston comprises a stem extending into the inlet passage, and wherein the spring element is provided around the stem.

13. The device according to claim 1, wherein the housing is composed of two housing parts, one housing part comprising the outlet passage and the other housing part comprising the inlet passage, the housing part comprising the outlet passage is composed of the peripheral wall and the bottom wall, and the other housing part is composed of the top wall and connector part.

14. In combination a fluid dose-measuring device and a fluid container, wherein
the fluid dose-measuring device is adapted to be releasably received in a dispensing apparatus having an electromagnetic coil and comprises: a housing with an outlet passage and a connector part defining an inlet passage, and said housing forming an internal chamber that is in fluid communication with the inlet passage and the outlet passage; a piston moveably arranged in the internal chamber of the housing for reciprocating motion between a closed position in which a fluid flow from the inlet passage to the outlet passage is prevented and an open position in which a fluid flow from the inlet passage to the outlet passage is allowed, said piston comprising a ferromagnetic actuation part for electromagnetic actuation of the piston by the electromagnetic coil and an outer body made of plastic, said ferromagnetic actuation part is arranged in the plastic outer body such that the plastic outer body encapsulates said ferromagnetic actuation part and prevents contact between said ferromagnetic actuation part and said fluid flow through the internal chamber of the housing; and
said connector part is connected to the fluid container and the connector part has a first connection position and second connection position relative to the fluid container, in the first connection position the connector part is pre-assembled to the fluid container and fluid communication between the fluid container and the device is blocked, and in the second connection position the connector part is in fluid communication with the device, and the connector part is configured to move between the first connection position and the second connection position by a relative rotation with respect to the fluid container about an axis parallel to a longitudinal direction of the connector part.

15. The combination according to claim 14, wherein the connector part is a male connector part and the fluid container comprises a female connector part, and wherein the dose-measuring device is connected to the fluid container by introduction of the male connector part into the female connector part.

16. A dispensing system comprising:
an electromagnetic coil;
a controller to drive the coil;
a dose-measuring device receivable by the solenoid coil; and a fluid container connected to the dose-measuring device,
the dose-measuring device comprising:
a housing with an outlet passage and a connector part defining an inlet passage, said housing forming an internal chamber that is in fluid communication with the inlet passage and the outlet passage, and said connector part being connectable to a fluid container;
a piston moveably arranged in the internal chamber of the housing for reciprocating motion between a closed position in which a fluid flow from the inlet passage to the outlet passage is prevented and an open position in which a fluid flow from the inlet passage to the outlet passage is allowed, said piston comprising a ferromagnetic actuation part for electromagnetic actuation of the piston by the coil,
the piston further comprises an outer body made of plastic, the outer body comprising a protrusion to sealingly engage with the outlet passage in the closed position, and said ferromagnetic actuation part is arranged in the outer body such that the outer body encapsulates said ferromagnetic actuation part and prevents contact between said ferromagnetic actuation part and said fluid flow through the internal chamber of the housing, wherein the outer body and the outlet passage have respective sealing surfaces engaging with each other in the closed position, and the sealing surface of the outlet passage extends to an exterior surface of the housing.

17. A dispensing system comprising:
an electromagnetic coil;
a controller to drive the coil;
a dose-measuring device receivable by the solenoid coil; and a fluid container connected to the dose-measuring device,
the dose-measuring device comprising a housing with an outlet passage and a connector part defining an inlet passage, and said housing forming an internal chamber that is in fluid communication with the inlet passage and the outlet passage; a piston moveably arranged in the internal chamber of the housing for reciprocating motion between a closed position in which a fluid flow from the inlet passage to the outlet passage is prevented and an open position in which a fluid flow from the inlet passage to the outlet passage is allowed, said piston comprising a ferromagnetic actuation part for electromagnetic actuation of the piston by the electromagnetic coil and an outer body made of plastic, said ferromagnetic actuation part is arranged in the outer body such that the outer body encapsulates said ferromagnetic actuation part and prevents contact between said ferromagnetic actuation part and said fluid flow through the internal chamber of the housing; and
said connector part has a first connection position and second connection position relative to the fluid container, in the first connection position the connector part is pre-assembled to the fluid container and fluid communication between the fluid container and the device is blocked, and in the second connection position the connector part is in fluid communication with the device, and the connector part is configured to move between the first connection position and the second connection position by a relative rotation with respect to the fluid container about an axis parallel to a longitudinal direction of the connector part.

* * * * *